US005205031A

United States Patent [19]

Hansson

[11] Patent Number: 5,205,031

[45] Date of Patent: Apr. 27, 1993

[54] DEVICE FOR TIGHTENING THREADED JOINTS

[75] Inventor: Gunnar C. Hansson, Stockholm, Sweden

[73] Assignee: Atlas Copco Tools AB, Stockholm, Sweden

[21] Appl. No.: 840,609

[22] Filed: Feb. 20, 1992

Related U.S. Application Data

[63] Continuation of Ser. No. 585,829, Sep. 20, 1990, abandoned.

[30] Foreign Application Priority Data

Sep. 22, 1989 [SE] Sweden ................................ 8903135

[51] Int. Cl.[5] ........................ B23P 19/04; B23P 21/00

[52] U.S. Cl. ........................................ 29/707; 29/714; 29/240; 318/434

[58] Field of Search ................. 29/240, 407, 706, 707, 29/709, 714; 318/432, 434; 388/937

[56] References Cited

U.S. PATENT DOCUMENTS

| | | | |
|---|---|---|---|
| 3,570,101 | 3/1971 | Stead | 29/709 X |
| 3,939,920 | 2/1976 | Hardiman et al. | 29/240 X |
| 4,066,942 | 1/1978 | Bardwell et al. | 318/434 |
| 4,267,629 | 5/1981 | Eshghy | 29/240 X |
| 4,282,640 | 8/1981 | Eshghy | 29/240 |
| 4,344,216 | 8/1982 | Finkelston | 29/240 X |
| 4,375,120 | 3/1983 | Sigmund | 29/240 X |
| 4,375,122 | 3/1983 | Sigmund | 29/240 X |
| 4,375,123 | 3/1983 | Ney | 29/240 X |
| 4,412,158 | 10/1983 | Jefferson et al. | 318/284 X |
| 4,463,293 | 7/1984 | Hornung et al. | |
| 4,510,424 | 4/1985 | Doniwa | 318/432 |
| 4,829,650 | 5/1989 | Galard | 29/240 X |
| 4,930,951 | 6/1990 | Gilliam | 29/407 X |
| 5,061,885 | 10/1991 | Fukahara | 318/434 |
| 5,065,494 | 11/1991 | Ebihara et al. | 29/407 X |
| 5,105,135 | 4/1992 | Nashiki et al. | 318/434 X |
| 5,105,519 | 4/1992 | Doniwa | 29/240 X |

FOREIGN PATENT DOCUMENTS

| | | |
|---|---|---|
| 2121285 | 8/1972 | France . |
| 1367201 | 9/1974 | United Kingdom . |

*Primary Examiner*—Timothy V. Eley
*Assistant Examiner*—C. Richard Martin
*Attorney, Agent, or Firm*—Frishauf, Holtz, Goodman & Woodward

[57] ABSTRACT

A method and a device for tightening threaded joints includes applying torque on the joint by means of a power tool until a predetermined pretension level in the joint is reached, whereupon a controller connected to the power tool is arranged on one hand to initiate power shut-off and on the other hand to initiate continued successively decreasing power supply to the tool as the predetermined pretension level is passed.

2 Claims, 2 Drawing Sheets

DEVICE FOR TIGHTENING THREADED JOINTS

This application is a continuation of application Ser. No. 07/585,829, filed Sep. 20, 1990, now abandoned.

This invention relates to a device for tightening threaded joints to a predetermined pretension level.

In particular, the invention relates to a manually supported device for tightening threaded joints in an improved manner as regards ergonomics.

A problem concerned with hand held power nutrunners is the difficulty for the operator to adapt his muscle force to the rapidly changing reaction forces developed in the tool housing and handles. Specifically, there is a problem for the operator to be exposed to the tiring jerks occurring at the end of the tightening process when the delivered torque and, accordingly, the reaction torque is abruptly discontinued. The operators' ability to react is not at all as quick as the torque disappearance in the tool handles, which means that the operator himself unintentionally causes a jerk of the tool.

The invention is hereinbelow described in further detail with reference to the accompanying drawings.

DETAILED DESCRIPTION

Figure 1:
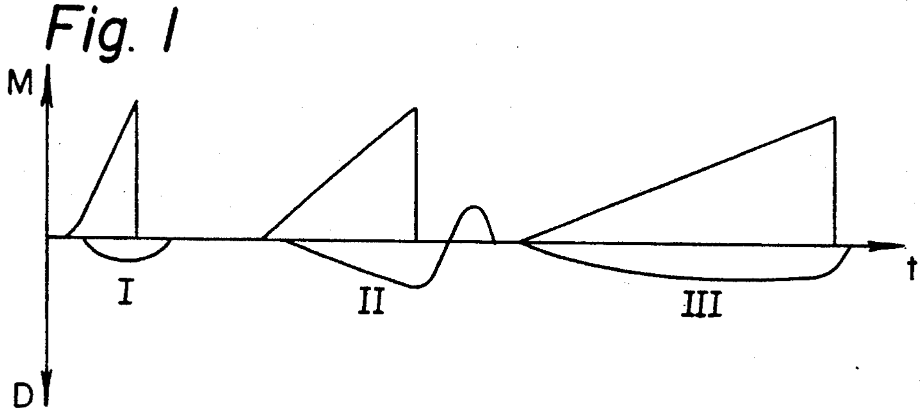
FIG. 1 shows a three axes diagram, illustrating the relationship between transferred torque, position of the tool handle and time in three different tightening cases according to the prior art.

In the diagram in FIG. 1, there is illustrated the relationship between the torque M transferred to the joint, the position D of the tool handle and time t for three different joints I, II, and III having different torque rates. Joint I is the stiffest joint with a very steep torque rate and a short tightening process duration. Joint II has a medium torque rate, whereas joint III has a low torque rate and a comparatively long tightening process duration.

Below the time axis, the position D of the tool handle is illustrated as a function of the delivered torque M and of time during the tightening process.

In all three cases illustrated in FIG. 1, the transferred torque is cut off very rapidly as illustrated by the vertical part at the right hand end of each curve. This very abrupt cut off of the delivered torque, however, is much too fast in relation to man's ability to react. This is illustrated by the D-curves extending past the right hand ends of the corresponding M-curves.

Dependent on the duration of the tightening process, the operator may overreact and, thereby, cause a double jerk in the tool handles and in his own arms. This very common situation is illustrated as tightening case II in FIG. 1. If the tightening process duration is very short as illustrated by case I in FIG. 1, the operator is too slow in his reaction to be able to put up a strong muscle action. Instead, most of the reaction torque is absorbed by the mass of the tool itself and by the mass of the operator's arms.

When tightening a joint with a low torque rate, as in case III in FIG. 1, there is required a comparatively long time to reach the predetermined pretension level. In this case the process duration is long enough not only for the operator to develop a required muscle power to withstand a continuous reaction torque, but also long enough to make it possible for the operator to build up a readiness for the torque discontinuation to come. This means that there will be no overreaction.

Figure 2:
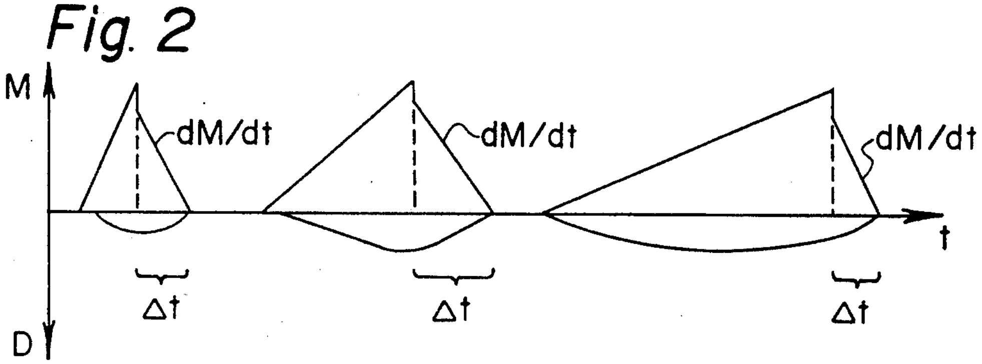
FIG. 2 shows a diagram similar to that in FIG. 1, but illustrating the tightening characteristics when applying the device according to the invention.

However, in order to avoid overreactions from the operator causing uncomfortable and tiring working conditions, the method and device according to the invention modifies the tightening process in such a way that the torque application on the threaded joint is extended in time past the point representing the predetermined pretension level. The extended torque application over a time interval $\Delta t$ has a gradually decreasing characteristic, and as illustrated in FIG. 2, torque is successively brought down to nill in a linear manner.

The torque decreasing rate dM/dt is adjustable so as to adapt the torque application characteristics of the tool to the individual ability to react of each operator. For example, the extended torque application time $\Delta t$ should be adjustable within the interval 0.1–0.5 s for the pretension torque interval 15–150 Nm, and for higher pretension torque magnitudes $\Delta t$ should be further extended. A suitable torque decreasing rate dM/dt should be 50–300 Nm/s.

Figure 3:
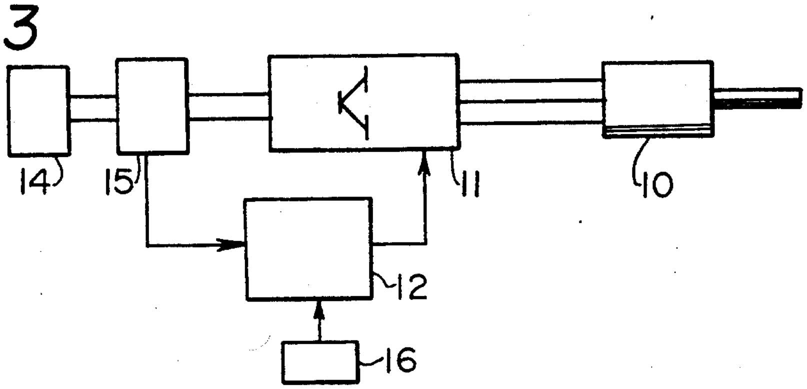
FIG. 3 shows a device according to one embodiment of the invention.

The device illustrated in FIG. 3 comprises an electrically powered tightening tool 10 comprising a brushless AC-motor, a power supply means 11 and a control unit 12. The power supply means 11 comprises an inverter which is fed with DC power from a DC power source 14 which delivers AC power of variable frequency and voltage amplitude to the tool 10.

A power detecting means 15 is provided between the DC power source 14 and the power supply means 11 and is connected to the control unit 12. To the latter there is also connected a torque rate adjusting means 16 by which a desirable value of the torque changing speed dM/dt may be set.

Figure 4:
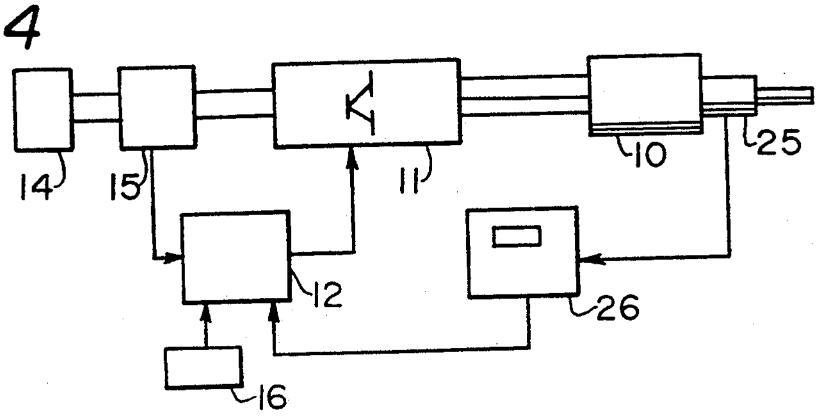
FIG. 4 shows a device according to another embodiment of the invention.

The control unit 12 comprises a programmable processor in which all necessary data for a two-step tightening process are installed. The device illustrated in FIG. 4 differs from the device in FIG. 2 in that the power tool carries a sensing means 25 for detecting the actual torque values during operation of the tool. This sensing means 25 is connected to a comparing unit 26 in which the actual sensed torque values are compared with desired set value. As the actual sensed value reaches the preset value, a signal is delivered to the control unit 12.

Figure 5:
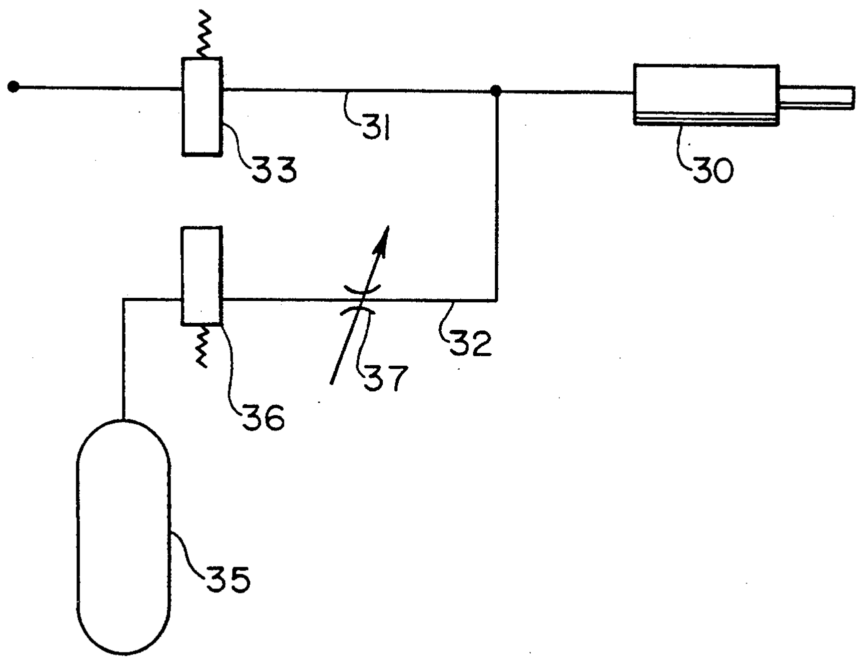
FIG. 5 shows a device according to still another embodiment of the invention.

The device shown in FIG. 5 comprises a pneumatic power tool 30 supplied with pressure air via two parallel feed lines 31, 32 one of which communicates with a pressure air source via a valve 33, whereas the other communicates with a pressure accumulator 35 via a valve 36 and an adjustable restriction 37.

During tightening, both valves 33, 36 are open, permitting pressure air to flow from the pressure air source to the tool 30 as well as to the accumulator 35. As the desired final pretension level in the joint is reached, the valve 33 is closed while valve 36 is still open, letting the pressure air stored in the accumulator 35 maintain the tool in operation for another time interval $\Delta t$. The emptying speed of the accumulator is determined by the setting of restriction 37, and along with a decreasing pressure in the accumulator feed line 32, the torque delivered by the tool 30 decreases. The emptying speed of the accumulator 35 corresponds directly to the decreasing rate dM/dt of the delivered torque, which means that dM/dt may be altered by adjustment of restriction 37.

I claim:

1. A device for tightening threaded joints to a predetermined torque level, comprising:

a torque delivering power tool (10);

power supply means (11) connecting said power tool to a power source, for supplying power to said power tool;

control means (12) coupled to said power supply means (11) for controlling said power supply means (11); and means for detecting torque delivered by said power tool in relation to time;

said control means (12) comprising means for controlling said power supply means to initiate shutting off of the power supply to said power tool as a predetermined torque level is reached, and for controlling said power supply means to initiate a continued, gradually over time decreasing power supply to said power tool as said predetermined torque level is reached.

2. The device of claim 1, wherein said control means for shutting off and for initiating a continued, gradually over time decreasing power supply, comprises adjusting means (16) for setting a decreasing power supply rate of said power supply means (11).

* * * * *